United States Patent
Chmiel et al.

(10) Patent No.: US 11,533,145 B2
(45) Date of Patent: Dec. 20, 2022

(54) METHOD, SYSTEM AND APPARATUS FOR EXTENDING TRANSMISSION DELAY IN CLEAR CHANNEL ASSESSMENT

(71) Applicant: NOKIA TECHNOLOGIES OY, Espoo (FI)

(72) Inventors: Mieszko Chmiel, Wroclaw (PL); Grzegorz Ciolkowski, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/641,204

(22) PCT Filed: Aug. 21, 2017

(86) PCT No.: PCT/EP2017/071032
§ 371 (c)(1),
(2) Date: Feb. 21, 2020

(87) PCT Pub. No.: WO2019/037830
PCT Pub. Date: Feb. 28, 2019

(65) Prior Publication Data
US 2020/0228284 A1 Jul. 16, 2020

(51) Int. Cl.
| | |
|---|---|
| *H04L 5/00* | (2006.01) |
| *H04L 27/00* | (2006.01) |
| *H04L 27/26* | (2006.01) |
| *H04W 16/14* | (2009.01) |
| *H04W 72/04* | (2009.01) |
| *H04W 74/08* | (2009.01) |

(52) U.S. Cl.
CPC ............ *H04L 5/0053* (2013.01); *H04L 5/001* (2013.01); *H04L 27/0006* (2013.01); *H04L 27/2655* (2013.01); *H04W 16/14* (2013.01); *H04W 72/042* (2013.01); *H04W 72/0446* (2013.01); *H04W 74/0808* (2013.01)

(58) Field of Classification Search
CPC ......... H04W 74/0808; H04W 72/0446; H04W 74/08; H04W 56/001
See application file for complete search history.

(56) References Cited

U.S. PATENT DOCUMENTS

| | | | |
|---|---|---|---|
| 2012/0170565 A1* | 7/2012 | Seok | H04L 5/0046 370/338 |
| 2017/0019909 A1* | 1/2017 | Si | H04W 76/28 |
| 2017/0164384 A1* | 6/2017 | Wang | H04L 5/0092 |

OTHER PUBLICATIONS

International Search Report and Written Opinion for International Application No. PCT/EP2017/071032, dated Apr. 30, 2018, 14 pages.
3GPP TSG RAN WG1 Meeting #85; R1-164072; "UL Category 4 LBT with eNB Assistance"; Nanjing, China; May 23-27, 2016; 5 pages.

(Continued)

*Primary Examiner* — Ayaz R Sheikh
*Assistant Examiner* — Debebe A Asefa
(74) *Attorney, Agent, or Firm* — Brake Hughes Bellermann LLP (57) ABSTRACT

A method comprising extending a transmission delay caused by a clear channel assessment check delaying a communication between an access point and a user equipment over an unlicensed transmission link beyond a start of an earliest possible subframe/slot with useful data, the transmission delay being extended till a defined period from a start of a subframe/slot.

21 Claims, 9 Drawing Sheets

(56) References Cited

OTHER PUBLICATIONS

3GPP TSG RAN WG1 Meeting #84bis; R1-162131; "Discussion on CCA Gap and Symbol Position for PUSCH and SRS for eLAA"; Busan, Korea; Apr. 11-15, 2016; 5 pages.
3GPP TSG RAN WG1 Meeting #80; R1-150155; "On Reservation Signal"; Athens, Greece; Feb. 9-13, 2015, 6 pages.
Office Action for European Application No. 17764516.5, dated Nov. 17, 2021, 5 pages.

\* cited by examiner

METHOD, SYSTEM AND APPARATUS FOR EXTENDING TRANSMISSION DELAY IN CLEAR CHANNEL ASSESSMENT

CROSS-REFERENCE TO RELATED APPLICATIONS

This application is a national stage entry of International Application No. PCT/EP2017/071032, filed Aug. 21, 2017, entitled "METHOD, SYSTEM AND APPARATUS FOR EXTENDING TRANSMISSION DELAY IN CLEAR CHANNEL ASSESSMENT" which is hereby incorporated by reference in its entirety.

FIELD

The present application relates to a method, apparatus, system and computer program and in particular but not exclusively to a method and apparatus for use in a network which may operate in so-called unlicensed bands.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. LTE is being standardized by the 3rd Generation Partnership Project (3GPP).

In order to increase the available spectrum, it has been proposed to use the unlicensed spectrum using for example some aspects of UTRAN and/or LTE technology.

SUMMARY

According to an aspect, there is provided a method comprising extending a transmission delay caused by a clear channel assessment check delaying a communication between an access point and a user equipment over an unlicensed transmission link beyond a start of an earliest possible subframe/slot with useful data, the transmission delay being extended till a defined period from a start of a subframe/slot.

The start of a subframe/slot may be one of: the start of an earliest possible subframe/slot with useful data; and a start of a subframe/slot following the start of an earliest possible subframe/slot with useful data and immediately preceding the actual start of a subframe/slot with useful data.

The method may further comprise: generating a truncated subframe signal to be used as a reservation signal to reserve the unlicensed transmission link till an actual start of a subframe/slot with useful data; and transmitting the truncated subframe signal after the extended transmission delay.

The communication may be a downlink between an access point and a user equipment and generating the truncated subframe signal after the extended transmission delay comprises generating the truncated subframe signal may comprise at least one of: a physical downlink shared channel signal; a cell specific reference signal; a primary synchronisation signal (PSS); a secondary synchronisation signal (SSS); part of a physical hybrid automatic repeat request indicator channel (PHICH); and part of a physical downlink control channel (PDCCH).

Extending a transmission delay may comprise: determining a successful clear channel assessment check during the defined period following the start of the subframe/slot; and extending the transmission delay by preventing a completion of the clear channel assessment check by maintaining, for the defined period following the start of the subframe/slot, a back-off counter value to a first value configured to prevent a transmission occurring, wherein the back-off counter value is decremented at a start of each clear channel assessment measurement period, such that the back-off counter value is a second value only after the start of a clear channel assessment measurement period following the defined period following the start of the subframe/slot.

Extending a transmission delay may comprise: determining a successful clear channel assessment check during the defined period from the start of the subframe/slot; implementing a self-deferral transmission mode until just before the end of the defined period from the start of the subframe/slot; and determining a successful short clear channel assessment check just before or at the end of the defined period from the start of the subframe/slot.

Extending a transmission delay may comprise: determining a successful clear channel assessment check during the defined period from the start of the subframe/slot; and switching on the transmitter for transmitting at the end of the defined period from the start of the subframe/slot.

The defined period may be a period such that the truncated subframe signal to be used as a reservation signal is not decoded by the user equipment as an unexpected physical control format indicator channel or physical downlink control channel or physical downlink shared channel.

The access point may be an eNB, and the method may further comprise: transmitting a data burst over the unlicensed transmission link on a long term evolution unlicensed spectrum, from the further subframe/slot start based on the reservation signal to reserve the unlicensed transmission link for the further subframe/slot start; and transmitting a further data burst over a long term evolution transmission link on a long term evolution licensed spectrum to provide a Licensed-Assisted Access communications system.

The defined period after the subframe/slot start may comprise one of: 1 orthogonal frequency division multiplexed symbol; 3 orthogonal frequency division multiplexed symbols; and a physical downlink control channel subframe/slot region.

According to a second aspect there is provided a computer program comprising computer executable code which when run on one or more processors causes the method of any preceding claim to be performed.

According to a third aspect there is provided an apparatus comprising at least one processor and at least one memory including computer code for one or more programs, the at least one memory and the computer code configured, with the at least one processor, to cause the apparatus at least to extend a transmission delay caused by a clear channel assessment check delaying a communication between an access point and a user equipment over an unlicensed transmission link beyond a start of an earliest possible subframe/slot with useful data, the transmission delay being extended till a defined period from a start of a subframe/slot.

The start of a subframe/slot may be one of: the start of an earliest possible subframe/slot with useful data; and a start of a subframe/slot following the start of an earliest possible subframe/slot with useful data and immediately preceding the actual start of a subframe/slot with useful data.

The processor may be further caused to: generate a truncated subframe signal to be used as a reservation signal to reserve the unlicensed transmission link till an actual start of a subframe/slot with useful data; and transmit the truncated subframe signal after the extended transmission delay.

The communication may be a downlink between an access point and a user equipment and the processor caused to generate the truncated subframe signal after the extended transmission delay may be further caused to generate the truncated subframe signal comprising at least one of: a physical downlink shared channel signal; a cell specific reference signal; a primary synchronisation signal (PSS); a secondary synchronisation signal (SSS); part of a physical hybrid automatic repeat request indicator channel (PHICH); and part of a physical downlink control channel (PDCCH).

The processor caused to extend a transmission delay may be further caused to: determine a successful clear channel assessment check during the defined period following the start of the subframe/slot; and extend the transmission delay by preventing a completion of the clear channel assessment check by maintaining, for the defined period following the start of the subframe/slot, a back-off counter value to a first value configured to prevent a transmission occurring, wherein the back-off counter value is decremented at a start of each clear channel assessment measurement period, such that the back-off counter value is a second value only after the start of a clear channel assessment measurement period following the defined period following the start of the subframe/slot.

The processor caused to extend a transmission delay may be further caused to: determine a successful clear channel assessment check during the defined period from the start of the subframe/slot; implement a self-deferral transmission mode until just before the end of the defined period from the start of the subframe/slot; and determine a successful short clear channel assessment check just before or at the end of the defined period from the start of the subframe/slot.

The processor caused to extend a transmission delay may be further caused to: determine a successful clear channel assessment check during the defined period from the start of the subframe/slot; and switch on the transmitter for transmitting at the end of the defined period from the start of the subframe/slot.

The defined period may be a period such that the truncated subframe signal to be used as a reservation signal is not decoded by the user equipment as an unexpected physical control format indicator channel or physical downlink control channel or physical downlink shared channel.

The access point may be an eNB, and the processor may be further caused to: transmit a data burst over the unlicensed transmission link on a long term evolution unlicensed spectrum, from the further subframe/slot start based on the reservation signal to reserve the unlicensed transmission link for the further subframe/slot start; and transmit a further data burst over a long term evolution transmission link on a long term evolution licensed spectrum to provide a Licensed-Assisted Access communications system.

The defined period after the subframe/slot start may comprise one of: 1 orthogonal frequency division multiplexed symbol; 3 orthogonal frequency division multiplexed symbols; and a physical downlink control channel subframe/slot region.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
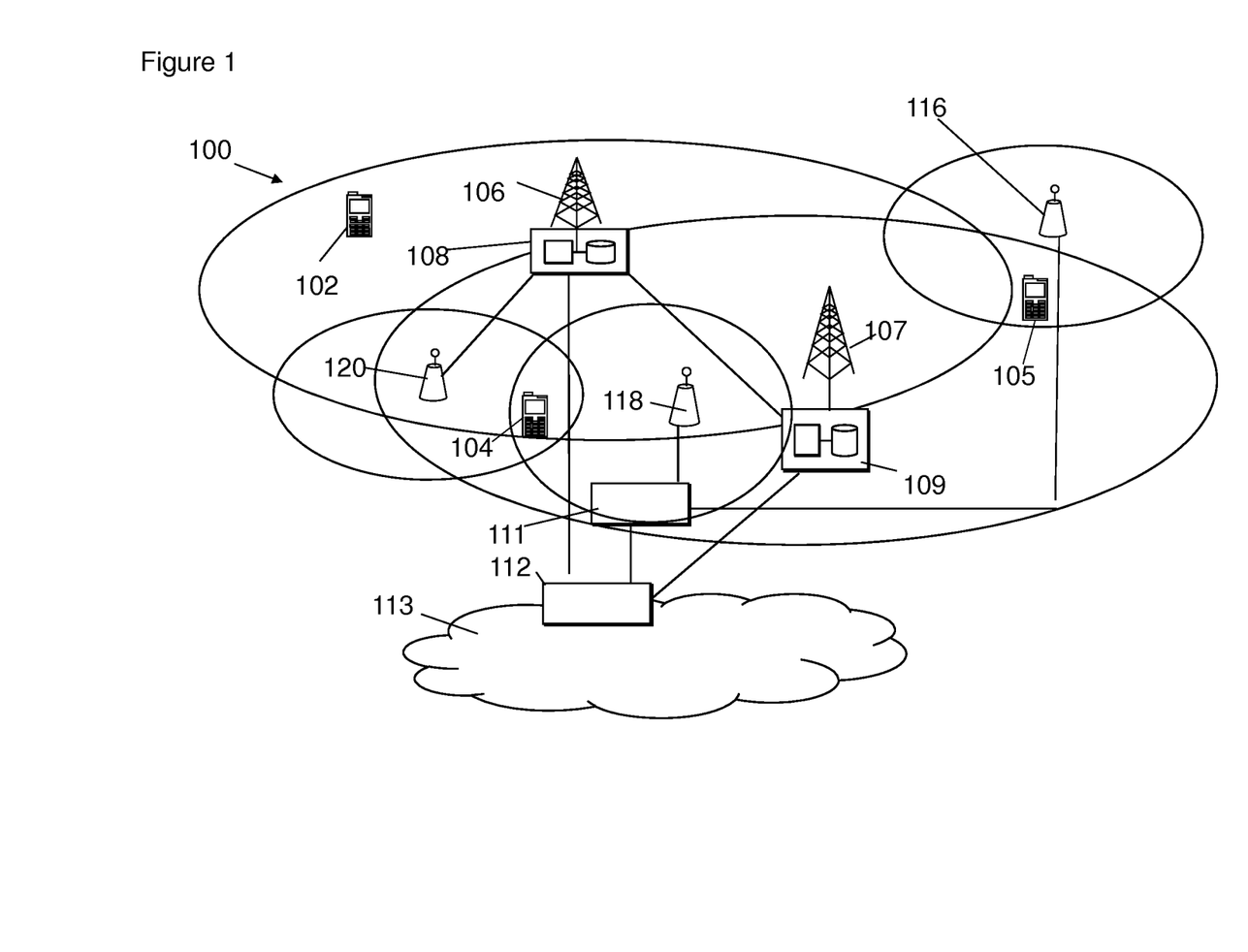
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as an eNodeB B (eNB) in LTE. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e) NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
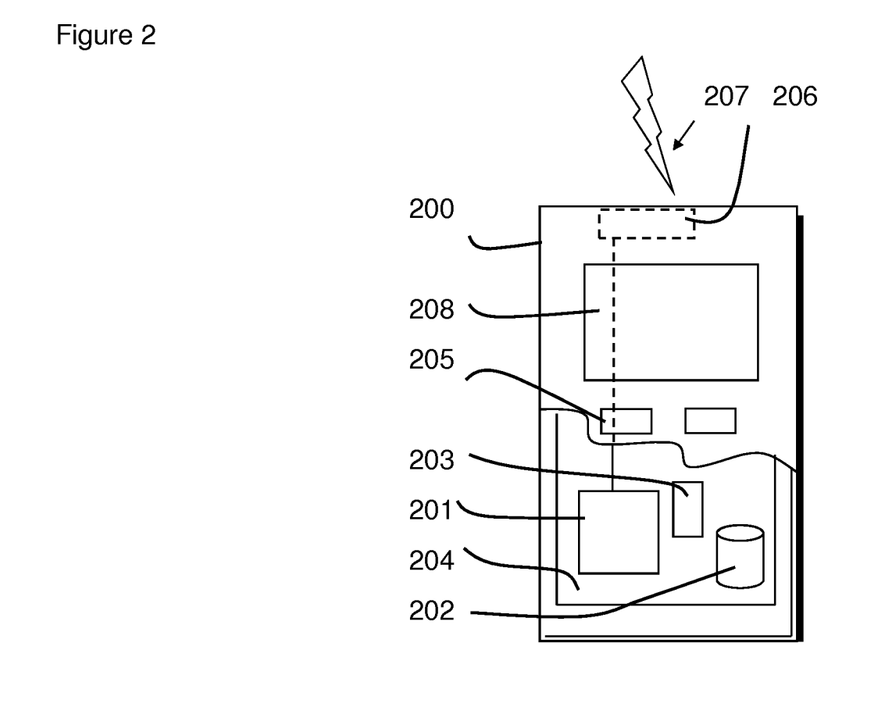
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Wireless communication systems may be licensed to operate in particular spectrum bands. A technology, for example LTE, may operate, in addition to a licensed band, in an unlicensed band. One technology for operating in unlicensed spectrum is Licensed-Assisted Access (LAA). Currently, a connection via a licensed band is maintained while using the unlicensed band with LAA technology.

Figure 3:
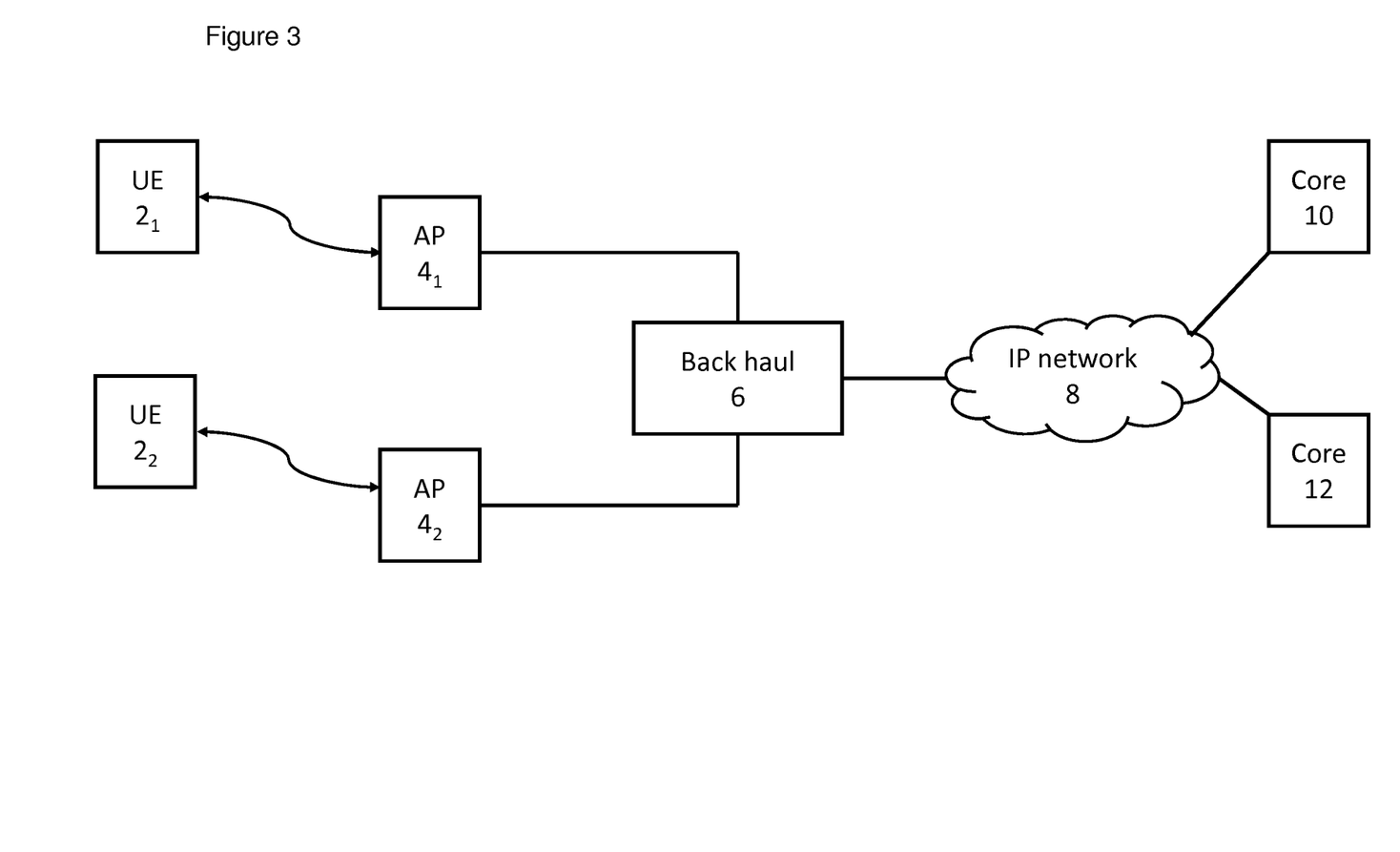
FIG. 3 shows a communication system in which some embodiments may be provided.

Reference is made to FIG. 3 which schematically shows a proposed LAA system. On the radio interface, LAA may rely on LTE technology. In some embodiments, there may be as few modifications as compared to LTE as possible. In the LAA system, user devices $2_1$ and $2_2$ such as previously described may be used. These user devices are referenced to as UE 2 FIG. 3. These devices may be conventional user equipment. Alternatively or additionally conventional user equipment may be modified in order to operate with a LAA network. Alternatively or additionally user equipment configured to work specifically with a LAA network may be provided.

The LAA system will use access points AP 4. In the LAA system, the radio interface may terminate on the UE 2 and on AP 4 on network side. In the example shown in FIG. 3 there are two AP shown, a first AP, AP 4₁ communicating with a UE 2₁ and a second AP, AP 4₂ communicating with a UE 22.

The access points AP 4₁ and 4₂ may be connected to a backhaul 6. The backhaul 6 may be configured to connect to an IP network 8 or the like. The IP network 8 may be coupled to a cellular core network 10 or a dedicated core network 12. Thus, the access point AP 4₁ may be connected to conventional cellular core network 10, i.e. EPC (Evolved Packet Core). This is the LTE packet core.

LAA may provide licensed-assisted access to unlicensed spectrum while coexisting with other technologies and fulfilling the regulatory requirements. In LAA, unlicensed spectrum may be utilized to improve DL (downlink) throughput. In some arrangements, one or more LAA DL SCell (secondary cell) may be configured to an UE as part of DL CA (carrier aggregation) configuration, while the PCell (primary cell) is on licensed spectrum.

However an LAA node needs to successfully complete a clear channel assessment (CCA aka Listen Before Talk) before transmitting on an unlicensed carrier.

However, the LAA node can start data transmission only on a subframe (1 ms) or a slot boundary (0.5 ms) which is a much coarser time division compared to typical unlicensed (for example Wi-Fi) timing. 3GPP standards have provided two alternative solutions to deal with the problem of coarse time LAA node transmission division.

A first approach is to use clear channel assessment (CCA) with self-deferral. In these approaches after completing a clear channel assessment, the LAA node waits silently until the next subframe/slot boundary and then performs a short clear channel assessment just before the slot/subframe boundary. This approach is generally lighter with respect to radio overhead and results in a higher peak data rate in an idle channel, though there is a risk that other nodes with much finer timing (e.g. Wi-Fi nodes) will grab the medium when the LAA nodes waits idle for up 1 ms.

A second approach is to use clear channel assessment (CCA) with a reservation signal. In such approaches after completing a CCA, the LAA node transmits a reservation signal until the next subframe/slot boundary and then transmits useful data from the slot/subframe boundary. The reservation signal prevents other nodes from grabbing the channel but requires more overhead and thus results in a lower peak data rate in an idle channel.

The reservation signal content and generation is not specified by 3GPP and left up to a specific implementation and thus is not standardised.

In some known reservation signals the reservation signal/initial signal is provided by the access point/eNB and has some auxiliary function in addition to its nominal function of grabbing and holding the medium. For example it may be used to provide reference signal and/or synchronization signal(s) or help cell (or operator) detection/identification or UE time/frequency synchronization or automatic gain control (AGC); conveys some control information or even comprise user data. In some other known examples the reservation signal/initial signal provided by the eNB does not have any auxiliary function in addition to its nominal function. For example the waveform is not known to the UE or the reservation signal structure and transmit power is up to the specific eNB implementation. In addition some known examples propose that the normal legacy LTE OFDM signal/symbol can be truncated by CCA and serve as a reservation signal in order to simplify implementation.

However the known examples do not discuss the aspects of reservation signal/initial signal in the cases where the CCA is delayed due to a busy medium and thus control/data transmission starts later than the initially intended time.

The concept as discussed in the embodiments herein is to provide and generate reservation signals when clear channel assessment is delayed due to a busy medium and thus for situations where control/data transmission starts later than the initially intended time.

This is embodied by determining if control/data transmission on an unlicensed carrier is delayed due to CCA and is to start later than the initially intended subframe/slot (for example the 1 ms subframe n in FIG. 5) then generate and transmit a truncated LTE data subframe/slot comprising physical downlink shared channel (PDSCH) and/or cell specific reference signal (CRS) content which is used as a reservation signal prior to transmission of useful control/data signals. In some embodiments the truncated LTE data subframe/slot may comprise a primary synchronisation signal (PSS), secondary synchronisation signal (SSS), part of a physical downlink control channel (PDCCH) content or part of a Physical Hybrid-ARQ Indicator Channel (PHICH) content.

Furthermore the concept is extended as discussed in detail later the first M orthogonal frequency division multiplexed symbols within the LTE data subframe/slot are not used for the truncated subframe/slot. This may be called a masking period or defined period in which the truncated subframe/slot is stopped from being transmitted. In other words even if there is CCA success in the first M (for example M=1 or M=3) OFDM symbols (or in the PDCCH region (variable)) then the first M OFDM symbols are not transmitted as part of the truncated subframe/slot. This masking period is defined to prevent unexpected physical control format indicator channel (PCFICH)/physical downlink control channel (PDCCH)/physical downlink shared channel (PDSCH) decoding by the UE.

Figure 5:
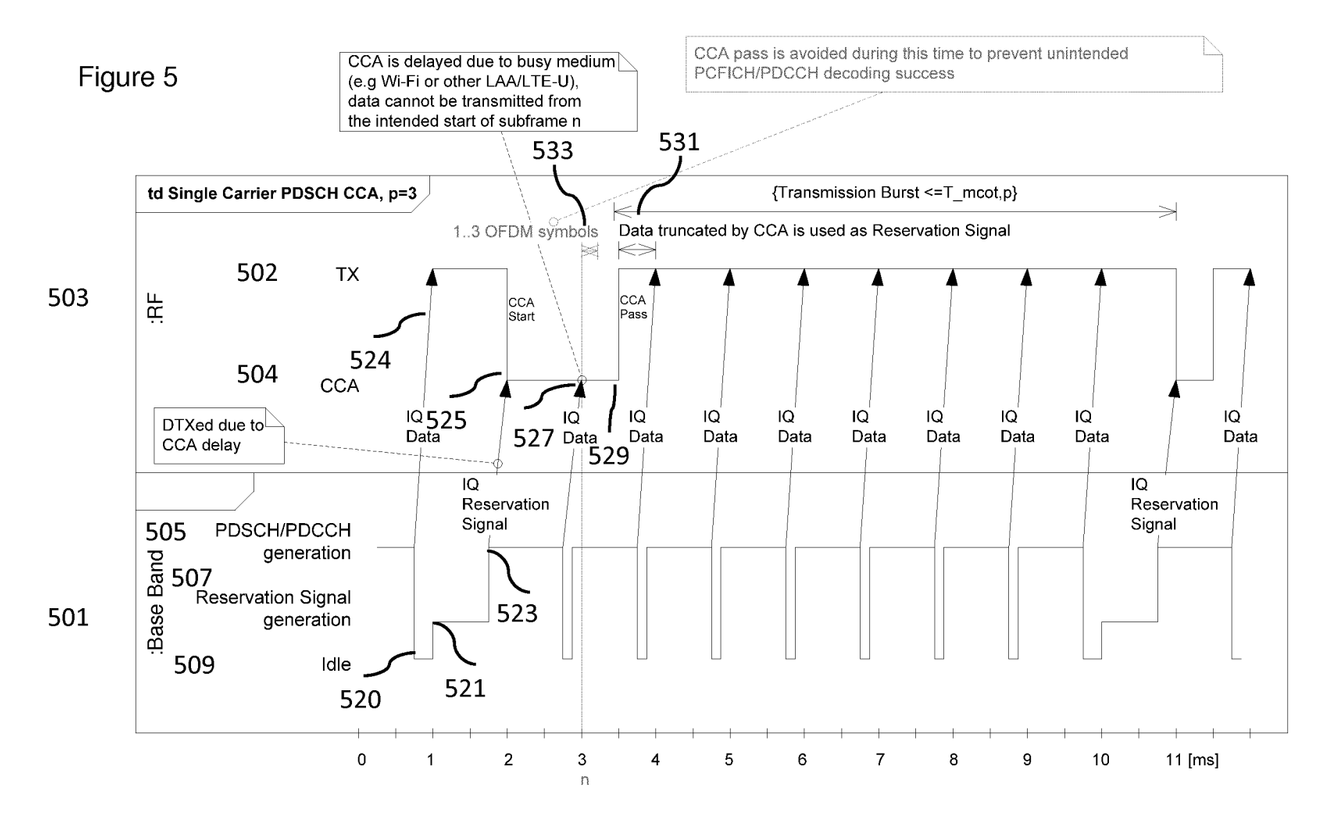
FIG. 5 shows a timing diagram of an example method using a truncated LTE data subframe/slot as a reservation signal according to some embodiments.

This for example may be shown in further detail within the unified modelling language timing diagram shown in FIG. 5. FIG. 5 shows for subframes from 0 ms to 12 ms the baseband 501 and radio frequency 503 timings in an example timing diagram for a single carrier physical downlink shared channel (PDSCH)/clear channel assessment (CCA).

The example shows the end of a previous transmission burst. This is shown by the previous burst end subframe baseband 501 switching from a physical downlink shared channel (PDSCH)/physical downlink control channel (PDCCH) generation mode 505 to an idle mode 509 as indicated by reference 520 and which occurs during the subframe from 0 ms to 1 ms. The last subframe of data is then transmitted on the air interface between 1 ms and 2 ms as shown by the arrow 524 linking the baseband physical downlink shared channel (PDSCH)/physical downlink control channel (PDCCH) generation 505 and the radiofrequency transmission mode 502.

The baseband then after a defined idle time, for example at the start of the next subframe (the 1 ms subframe), switches to a reservation signal generation mode 507 for example shown by reference 521. This is reflected by the radiofrequency switching to start to perform clear channel assessment (CCA) 504 shown by the reference 525 at the start of the 2 ms subframe.

The baseband furthermore switches to physical downlink shared channel (PDSCH)/physical downlink control channel (PDCCH) generation 505 at reference 523. However due to a busy medium (for example Wi-Fi or other LAA/LTE-U) the completion of the CCA does not happen in time for the transmission of data to start at the start of the subframe at 3 ms shown by reference 527. This can be seen as the earliest possible subframe/slot. In other words an earliest subframe/slot may be defined as the next subframe/slot after completing the CCA without any delay.

However by the time that the CCA completes during the starting at 3 ms then the transmitter may be configured to start to transmit a truncated subframe of data 531 shown by reference 529. The truncated subframe of data 531 may then be used as a reservation signal which then allows the transmitter to continue to transmit the complete transmission burst for the subframes starting from 4 ms to 10 ms. In other words this defines the start of an earliest possible subframe/slot with useful data.

Furthermore as shown in FIG. 5 there is shown a masking or defined period 533 which occurs from the start of the 3 ms subframe and is a period associated with a defined number of symbols. As the completion of the CCA occurs after the end of the masking period 533 the truncated subframe of data 531 can be transmitted immediately. However, the same figure may be used to show the handling of a CCA success during the masking period 533. In such a case, the transmission of the truncated subframe of data is artificially deferred to the end of the masking period 533. The defined or masking period in some embodiments may be defined by an integer number of OFDM symbols as shown in some of the following examples. However in some embodiments such as also shown the defined or masking period may be defined by any suitable period such as a clear channel assessment period.

Figure 6:
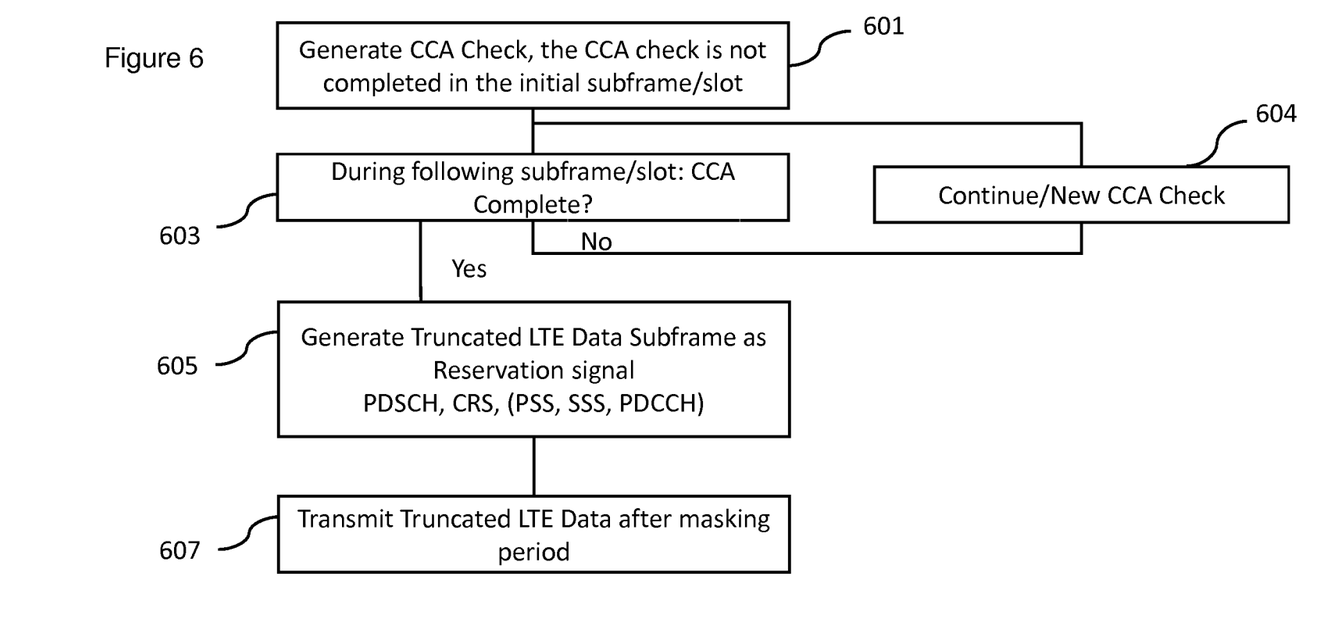
FIG. 6 shows a flowchart of an example method using the truncated LTE data subframe/slot as a reservation signal according to some embodiments.

With respect to FIG. 6 a flow diagram of the operations of the operations of the access point (for example a eNB configured to operate over LAA/LTE-U) according to some embodiments in attempting to transmit is shown.

The first operation is to generate a clear channel assessment (CCA) check, and where the CCA is not completed in the initial subframe/slot.

The operation of generating a clear channel assessment check and the CCA is not completed in the initial subframe/slot is shown in FIG. 6 by step 601.

The access point may furthermore in the following subframe/slot determine whether the clear channel assessment check is completed.

The operation of determining whether the CCA is complete during the following subframe/slot is shown in FIG. 6 by step 603.

Where the CCA is not complete the operation may pass to step 604. The access point may continue the CCA check as shown in step 604 and then pass back to step 603.

Where the CCA is complete in the following subframe/slot then the access point may be configured to generate a truncated LTE data subframe which is used by the system as a reservation signal.

The truncated LTE data subframe may in some embodiments be a physical downlink shared channel (PDSCH) and/or cell specific reference signal (CRS) content. In some embodiments the truncated LTE data subframe/slot may comprise a primary synchronisation signal (PSS) and/or secondary synchronisation signal (SSS) and/or part of a physical downlink control channel (PDCCH).

The operation of generating a truncated LTE data subframe which is used by the system as a reservation signal 605.

Furthermore the access point may be configured to transmit the truncated LTE data subframe as a reservation signal after the defined or masking period. The operation of transmitting the transmit the truncated LTE data subframe as a reservation signal after the masking period is shown in FIG. 6 by step 607.

Figure 7:
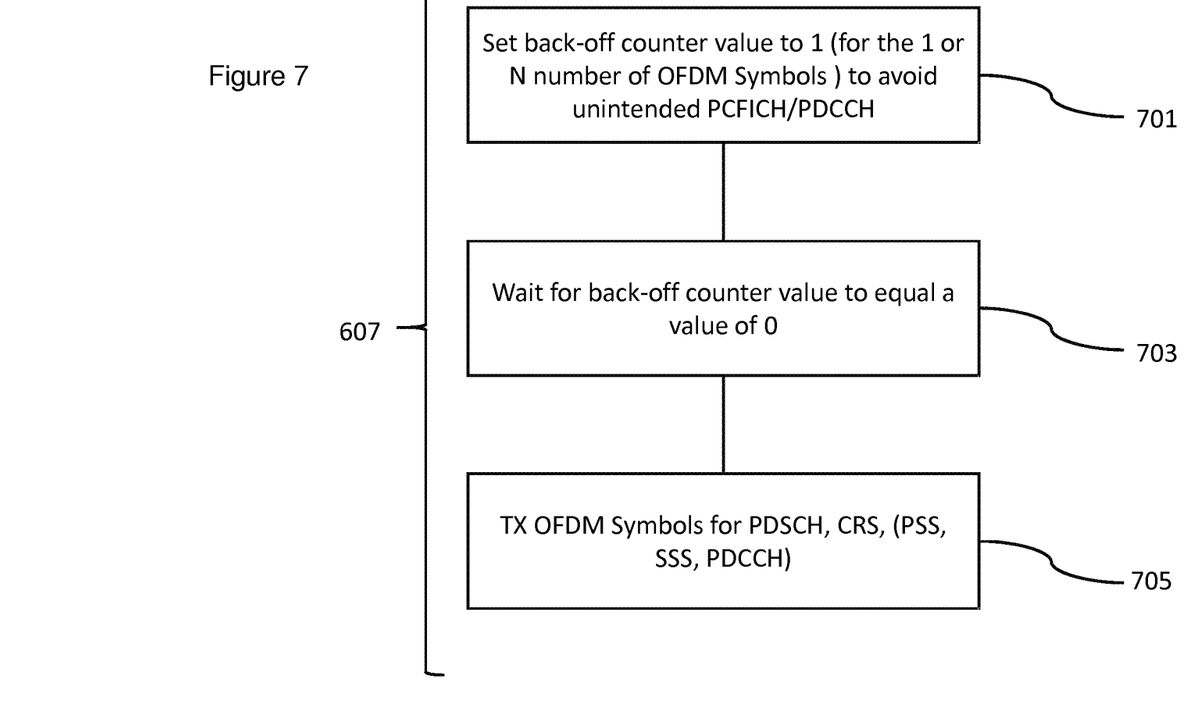
FIGS. 7 to 9 show flowcharts of example methods for managing transmission of the truncated LTE data subframe/slot as shown in FIG. 5.

A first example of the implementation of the masking period to prevent transmitting the truncated LTE data subframe as a reservation signal (in order to prevent unexpected PCFICH/PDCCH/PDSCH decoding by the UE) is shown with respect to the flow diagram shown in FIG. 7.

In some embodiments the access point may be configured to use a back-off counter which is employed before transmission. Thus in some embodiments the back-off counter is changed to a value of 1 (this value is set during the 1 or M symbols based on the defined period length in symbols).

The operation of setting the back-off counter value to 1 is shown in FIG. 7 by step 701.

Then the back-off counter (for example the counter of TS36.213) is configured to count CCA sensing intervals and is decremented by each idle CCA sensing interval but is set back to the value of 1 such as shown in step 701 until the defined period is ended and then at the end of the following CCA sensing interval the back-off counter may be decremented to a value of 0.

The operation of waiting for the back-off counter to decrement to 0 is shown in FIG. 7 by step 703.

Once the back-off counter has reached 0 then the OFDM symbols can be transmitted.

The operation of transmitting the OFDM symbols is shown in FIG. 7 by step 705.

Thus in summary the masking period may be implemented by incrementing a back-off counter N as defined in TS 36.213 in the first OFDM symbol (or first M symbols or in general the defined period) of subframes after the channel is sensed as idle during a slot duration with N<=0 or during a defer duration with N<=0.

Figure 8:
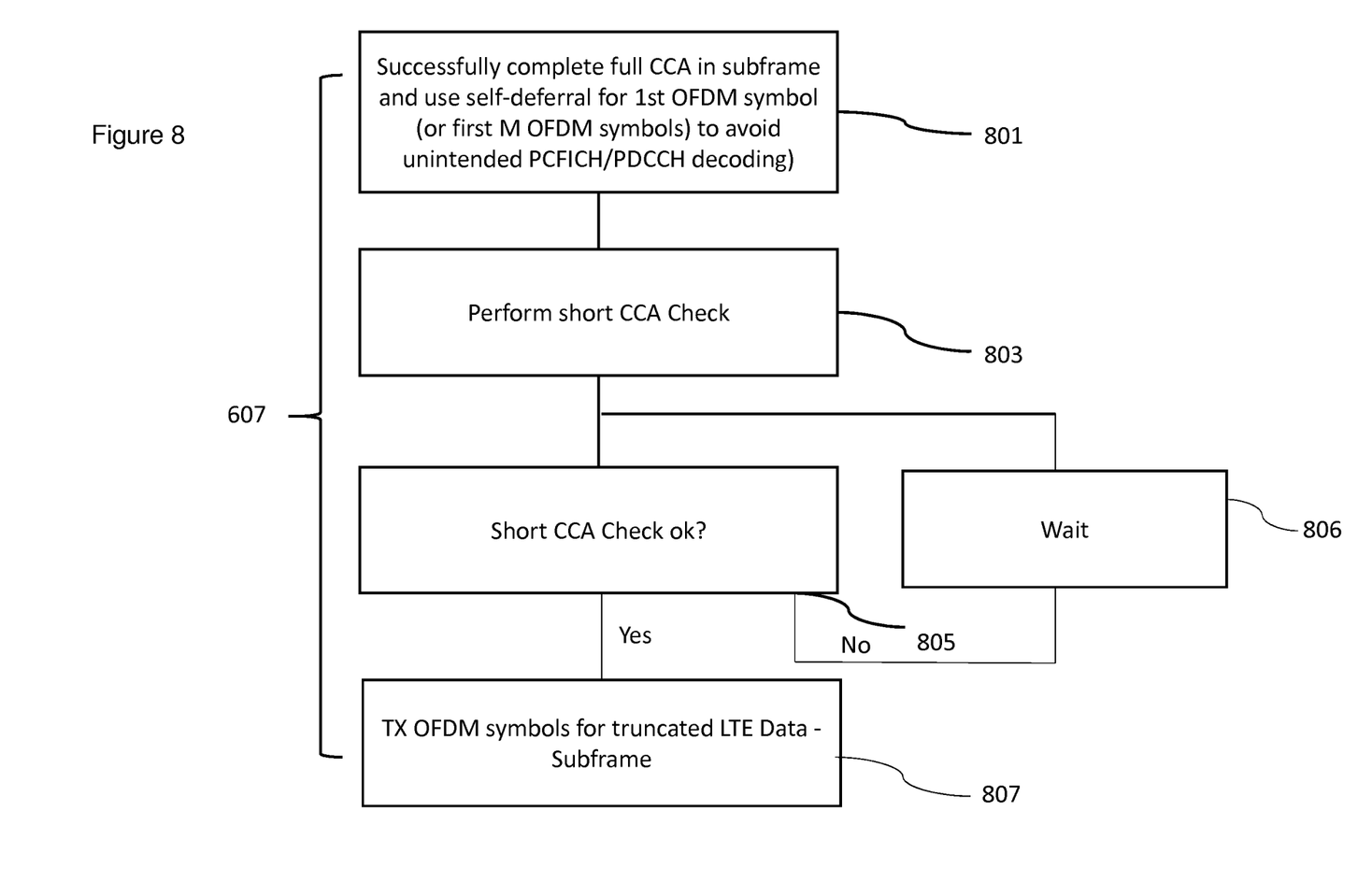

A further example of the implementation of the masking period is shown in FIG. 8.

In some embodiments the access point, following a successfully completed full CCA in subframe the access point can use self-deferral for a 1st OFDM symbol (or first M OFDM symbols).

The use of self-deferral for the 1st (or first M) OFDM symbols is shown in FIG. 8 step 801.

Then the access point is configured to perform a short CCA check. The operation of performing a short CCA check is shown in FIG. 8 by step 803.

The access point may then determine whether the short CCA check is ok. The operation of determining whether the short CCA check is ok is shown in FIG. 8 by step 805.

When the check is not ok then the check continues. The operation of continuing the check is shown in FIG. 8 by step 806 and passes back to step 805.

Where the check is ok the OFDM symbols (or part of them) are transmitted. The operation of transmitting the OFDM symbols is shown in FIG. 8 by step 807.

Thus in summary the access point may be configured to use self-deferral and a short CCA when the first OFDM symbol (or first M OFDM symbols) are about to end and the full CCA was successfully completed in the subframe.

Figure 9:
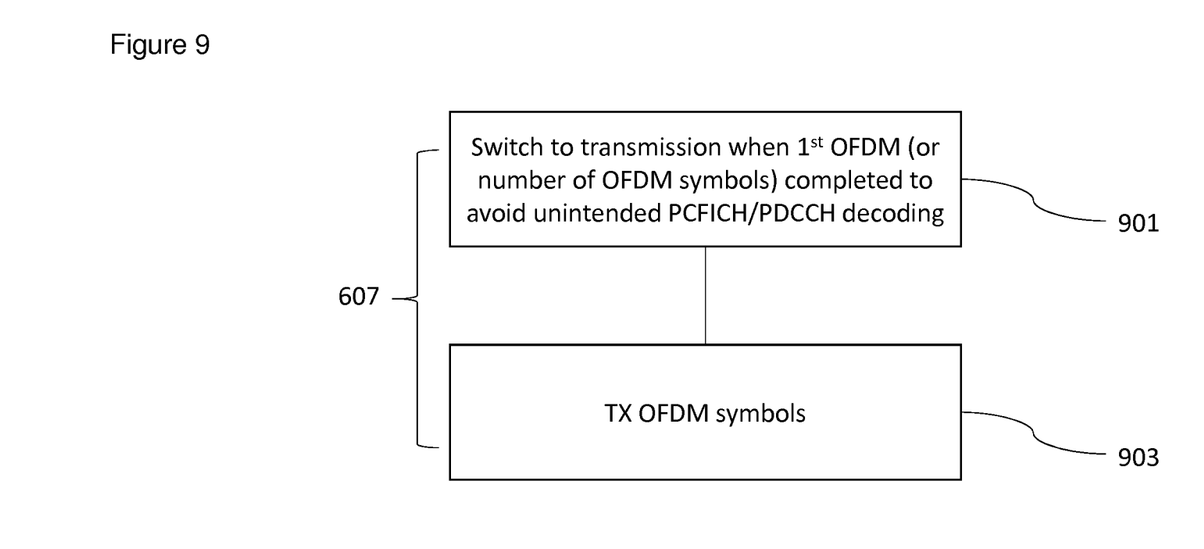

With respect to FIG. 9 another example of the implementation of the masking period is shown.

In some embodiments the access point is configured to control the transmitter to start transmission of the OFDM symbols when the first (or the first M) symbol period of the subframe is completed.

The operation of controlling the transmitter to start transmission of the OFDM symbols when the first (or first M) symbol period of the subframe is completed is shown in FIG. 9 by step 901.

The access point is then configured to transmit the OFDM symbols.

The operation of transmitting the OFDM symbols is shown in FIG. 9 by step 903.

In summary this example may be to switch to transmission when the first OFDM symbol (or first M OFDM symbols) ends and the CCA was successfully completed in the subframe.

Although in some embodiments the reservation signal is generated by the baseband module and the CCA is performed by the RF module in some further embodiments the initial reservation signal may be generated by the RF module.

In performing such embodiments a Fast RX to TX switching time can be achieved because the RF module does not have to do another step of generating the reservation signal after CCA is successfully completed. Though this benefit is not applicable to the first OFDM symbols (or first M OFDM symbols) of a subframe with a delayed CCA. Furthermore the use of the masking period may thus prevent any unexpected PCFICH/PDCCH/PDSCH decoding at the UE. Additionally in such embodiments there is no need to generate and transmit fractional symbols which simplifies the implementation. The access point, for example the eNB has a very short time to generate the symbols because the instance that the CCA successfully ends is not known.

In such embodiments the LTE data subframe which has been prepared for the successful CCA can be used as a reservation signal for any delayed successful CCA. This simplifies implementation as there is no need to regenerate the subframe (from a data subframe to a reservation/initial signal subframe) if the CCA is delayed and overlaps with planned data transmission. Furthermore there is no need to generate alternate subframes (one with UE data and at least one with a reservation/initial signal) when the CCA is delayed.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of an unlicensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

Figure 4:
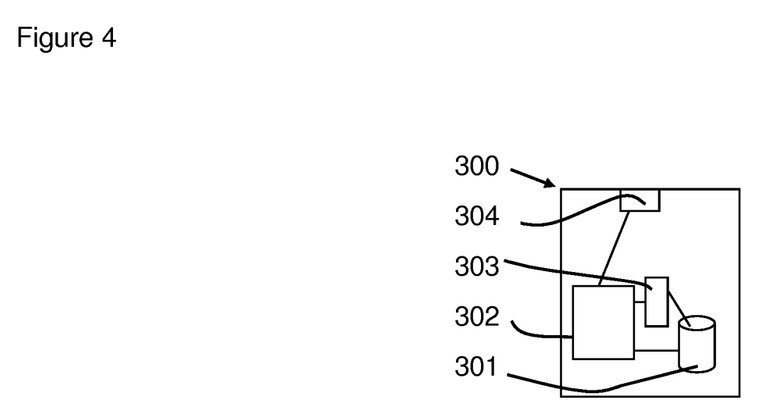
FIG. 4 shows a schematic diagram of an example control apparatus.

The method may be implemented in entities on a control apparatus as shown in FIG. 4. FIG. 4 shows an example of a control apparatus provided in a base station or access point. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
successfully completing a clear channel assessment and based on the successful completion of the clear channel assessment, extending a transmission delay, the extension of the transmission delay including delaying a communication between an access point and a user equipment over an unlicensed transmission link beyond a start of an earliest possible subframe/slot with useful data, the transmission delay being extended till a defined period from a start of a subframe/slot, the defined period being an integer multiple of OFDM symbols.

2. The method as claimed in claim 1, wherein the start of a subframe/slot is one of:
the start of an earliest possible subframe/slot with useful data; and
a start of a subframe/slot following the start of an earliest possible subframe/slot with useful data and immediately preceding an actual start of a subframe/slot with useful data.

3. The method as claimed in claim 1, further comprising:
generating a truncated subframe signal to be used as a reservation signal to reserve the unlicensed transmission link till an actual start of a subframe/slot with useful data; and
transmitting the truncated subframe signal after the extended transmission delay.

4. The method as claimed in claim 3, wherein the communication is a downlink between an access point and a user equipment and generating the truncated subframe signal after the extended transmission delay comprises generating the truncated subframe signal comprising at least one of:
a physical downlink shared channel signal;
a cell specific reference signal;
a primary synchronisation signal (PSS);
a secondary synchronisation signal (SSS);
part of a physical hybrid automatic repeat request indicator channel (PHICH); and
part of a physical downlink control channel (PDCCH).

5. The method as claimed in claim 3, wherein extending a transmission delay comprises:
determining a successful clear channel assessment check during the defined period following the start of the subframe/slot; and
extending the transmission delay by preventing a completion of the clear channel assessment check by maintaining, for the defined period following the start of the subframe/slot, a back-off counter value to a first value configured to prevent a transmission occurring, wherein the back-off counter value is decremented at a start of each clear channel assessment measurement period, such that the back-off counter value is a second value only after the start of a clear channel assessment measurement period following the defined period following the start of the subframe/slot.

6. The method as claimed in claim 3, wherein extending a transmission delay comprises:
determining a successful clear channel assessment check during the defined period from the start of the subframe/slot;
implementing a self-deferral transmission mode until just before an end of the defined period from the start of the subframe/slot; and
determining a successful short clear channel assessment check just before or at the end of the defined period from the start of the subframe/slot.

7. The method as claimed in claim 3, wherein extending a transmission delay comprises:
determining a successful clear channel assessment check during the defined period from the start of the subframe/slot; and
switching on a transmitter for transmitting at an end of the defined period from the start of the subframe/slot.

8. The method as claimed in claim 3, wherein the defined period is a period such that the truncated subframe signal to be used as a reservation signal is not decoded by the user equipment as an unexpected physical control format indicator channel or physical downlink control channel or physical downlink shared channel.

9. The method as claimed in claim 3, wherein the access point is an eNB, and the method further comprises:
transmitting a data burst over the unlicensed transmission link on a long term evolution unlicensed spectrum, from the further subframe/slot start based on the reservation signal to reserve the unlicensed transmission link for the further subframe/slot start; and
transmitting a further data burst over a long term evolution transmission link on a long term evolution licensed spectrum to provide a Licensed-Assisted Access communications system.

10. The method as claimed in claim 1, wherein the defined period after the subframe/slot start comprises one of:
1 orthogonal frequency division multiplexed symbol;
3 orthogonal frequency division multiplexed symbols; and
a physical downlink control channel subframe/slot region.

11. An apparatus comprising at least one processor and at least one memory including computer code for one or more programs, the at least one memory and the computer code configured, with the at least one processor, to cause the apparatus at least to:
successfully complete a clear channel assessment and based on the successful completion of the clear channel assessment, extend a transmission delay, the extension of the transmission delay including delaying a communication between an access point and a user equipment over an unlicensed transmission link beyond a start of an earliest possible subframe/slot with useful data, the transmission delay being extended till a defined period from a start of a subframe/slot, the defined period being an integer number of OFDM symbols.

12. The apparatus as claimed in claim 11, wherein the start of a subframe/slot is one of:
the start of an earliest possible subframe/slot with useful data; and
a start of a subframe/slot following the start of an earliest possible subframe/slot with useful data and immediately preceding an actual start of a subframe/slot with useful data.

13. The apparatus as claimed in claim 11, the processor further caused to:
generate a truncated subframe signal to be used as a reservation signal to reserve the unlicensed transmission link till an actual start of a subframe/slot with useful data; and
transmit the truncated subframe signal after the extended transmission delay.

14. The apparatus as claimed in claim 13, wherein the communication is a downlink between an access point and a user equipment and the processor caused to generate the truncated subframe signal after the extended transmission delay is further caused to generate the truncated subframe signal comprising at least one of:
a physical downlink shared channel signal;
a cell specific reference signal;
a primary synchronisation signal (PSS);
a secondary synchronisation signal (SSS);
part of a physical hybrid automatic repeat request indicator channel (PHICH); and
part of a physical downlink control channel (PDCCH).

15. The apparatus as claimed in claim 13, wherein the processor configured to extend a transmission delay is further configured to:
determine a successful clear channel assessment check during the defined period following the start of the subframe/slot; and
extend the transmission delay by preventing a completion of the clear channel assessment check by maintaining, for the defined period following the start of the subframe/slot, a back-off counter value to a first value configured to prevent a transmission occurring, wherein the back-off counter value is decremented at a start of each clear channel assessment measurement period, such that the back-off counter value is a second value only after the start of a clear channel assessment measurement period following the defined period following the start of the subframe/slot.

16. The apparatus as claimed in claim 13, wherein the processor configured to extend a transmission delay is further configured to:
determine a successful clear channel assessment check during the defined period from the start of the subframe/slot;
implement a self-deferral transmission mode until just before an end of the defined period from the start of the subframe/slot; and
determine a successful short clear channel assessment check just before or at the end of the defined period from the start of the subframe/slot.

17. The apparatus as claimed in claim 13, wherein the processor configured to extend a transmission delay is further configured to:
determine a successful clear channel assessment check during the defined period from the start of the subframe/slot; and
switch on a transmitter for transmitting at an end of the defined period from the start of the subframe/slot.

18. The apparatus as claimed in claim 13, wherein the defined period is a period such that the truncated subframe signal to be used as a reservation signal is not decoded by the user equipment as an unexpected physical control format indicator channel or physical downlink control channel or physical downlink shared channel.

19. The apparatus as claimed in claim 13, wherein the access point is an eNB, and the processor is configured to:
transmit a data burst over the unlicensed transmission link on a long term evolution unlicensed spectrum, from the further subframe/slot start based on the reservation signal to reserve the unlicensed transmission link for the further subframe/slot start; and
transmit a further data burst over a long term evolution transmission link on a long term evolution licensed spectrum to provide a Licensed-Assisted Access communications system.

20. The apparatus as claimed in claim 11, wherein the defined period after the subframe/slot start comprises one of:
1 orthogonal frequency division multiplexed symbol;
3 orthogonal frequency division multiplexed symbols; and
a physical downlink control channel subframe/slot region.

21. A non-transitory computer-readable storage medium comprising instructions stored thereon that, when executed by at least one processor, are configured to cause a computing system to:
successfully complete a clear channel assessment and
based on the successful completion of the clear channel assessment, extend a transmission delay, the extension of the transmission delay including delaying a communication between an access point and a user equipment over an unlicensed transmission link beyond a start of an earliest possible subframe/slot with useful data, the transmission delay being extended till a defined period from a start of a subframe/slot, the defined period being an integer multiple of OFDM symbols.

* * * * *